United States Patent
Jackson

[11] 3,721,405
[45] March 20, 1973

[54] AZIMUTHAL PROPULSION-CONTROL SYSTEM

[76] Inventor: Janko Jackson, 200 Panorama Drive, Oxon Hill, Md. 20022

[22] Filed: May 13, 1970

[21] Appl. No.: 36,831

[52] U.S. Cl. ............................................244/17.21
[51] Int. Cl. ..............................................B64c 27/82
[58] Field of Search...244/17.21, 17.19, 17.17, 17.11

[56] References Cited

UNITED STATES PATENTS

| 910,773 | 1/1909 | Bea | 244/17.21 |
| 1,020,945 | 3/1912 | Chase | 244/17.21 |
| 2,378,617 | 6/1945 | Burke | 244/17.19 UX |

FOREIGN PATENTS OR APPLICATIONS

| 468,329 | 1/1952 | Italy | 244/17.21 |

Primary Examiner—Milton Buchler
Assistant Examiner—Paul E. Sauberer
Attorney—R. S. Sciascia, Arthur L. Branning, J. G. Murray and M. L. Crane

[57] ABSTRACT

This invention is directed to a variable lateral-attitude propulsion system principally for heavier-than-air craft such as powered autogyro vehicles, and for lighter-than-air craft as well as for ground effects lifting means. This propulsion system provides horizontal movement to the vehicle as well as azimuthal control and directional movement along the horizontal, all without the use of a conventional rudder.

2 Claims, 2 Drawing Figures

PATENTED MAR 20 1973

3,721,405

INVENTOR
JANKO JACKSON

AZIMUTHAL PROPULSION-CONTROL SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Heretofore, heavier-than-air craft such as powered autogyro vehicles have employed a forward propulsion motor fixed to the airframe. A rudder has been required to induce turning moments to obtain azimuthal (yaw) control. Additional directional effects can be achieved by varying the angle-of-attack of the gimbaled main rotor of the autogyro vehicle. The total effect of both rudder action and main rotor angle-of-attack variation is that a change in azimuthal direction also results in re-orientation of the entire airframe into the new heading.

Similarly, for any lighter-than-air craft which has the directional control motor fixed to the airframe, an azimuthal re-direction results in re-orientation of the entire vehicle into the new heading.

This effect is particularly troublesome in applications where the type of vehicle described above is operated as a drone, or on a tether and/or carries a payload(s) sensitive to horizontal directional (azimuthal) changes. In the case of a tethered vehicle, due to the re-orientation of the airframe resulting from a change in heading, a universal cable joint must be provided at the point that the tether is attached to the airframe. If a direction-sensitive payload is carried aboard the vehicle, be it a drone or tethered vehicle, a complicated direction sensing/correcting system must be provided, between the airframe and payload, to maintain a given heading of the payload independent of the azimuthal airframe motion.

Even with these corrective provisions, a rudder is still required, with all of its attendant controls, to effect azimuthal (yaw) control.

SUMMARY OF THE INVENTION

The variable lateral-attitude propulsion system of this invention is directed to a pusher or tractor horizontal-propulsion unit mounting which is rotatable around a vertical axis. This mounting is rotatable through a complete 360 degrees independent of the air frame, providing azimuthal control and directional movement along the horizontal. Positioning of the horizontal-propulsion unit is accomplished by means of a separate drive unit which may be remotely controlled or which may be varied continuously by an on-board guidance system.

In the case of an application of this invention, the horizontal-propulsion unit mounting is positioned concentric with the main rotor mast, and is rotatable 360° around the axis of the mast. When changing direction the horizontal-propulsion unit is rotated with respect to the payload such that the payload remains in the same relative heading with respect to North. The horizontal propulsion unit of this invention may be applied to a powered autogyro, a vertical lift propeller driven device, to a ballon used for lifting payloads or to a ground effects device which directs its lift force toward the ground.

STATEMENT OF THE OBJECTS

It is therefore an object of the present invention to provide a horizontal propulsion system which is separate from the lifting power means and free for movement about the regular, vertical power or load shaft.

Another object is to provide a guidance means for a vertically lifted vehicle, such as a powered autogyro, which does not require the use of a rudder.

Still another object is to provide a control means which permits one to execute horizontal turns much easier and within a shorter time period for vertically lifted payloads.

Yet another object is to provide a powered autogyro vehicle which may be made of various configurations since the use of a rudder is not necessary.

Other and more specific objects of this invention will become apparent upon a careful consideration of the following detailed description when taken together with the accompanying drawings.

DESCRIPTION OF THE DRAWINGS

Figure 1:
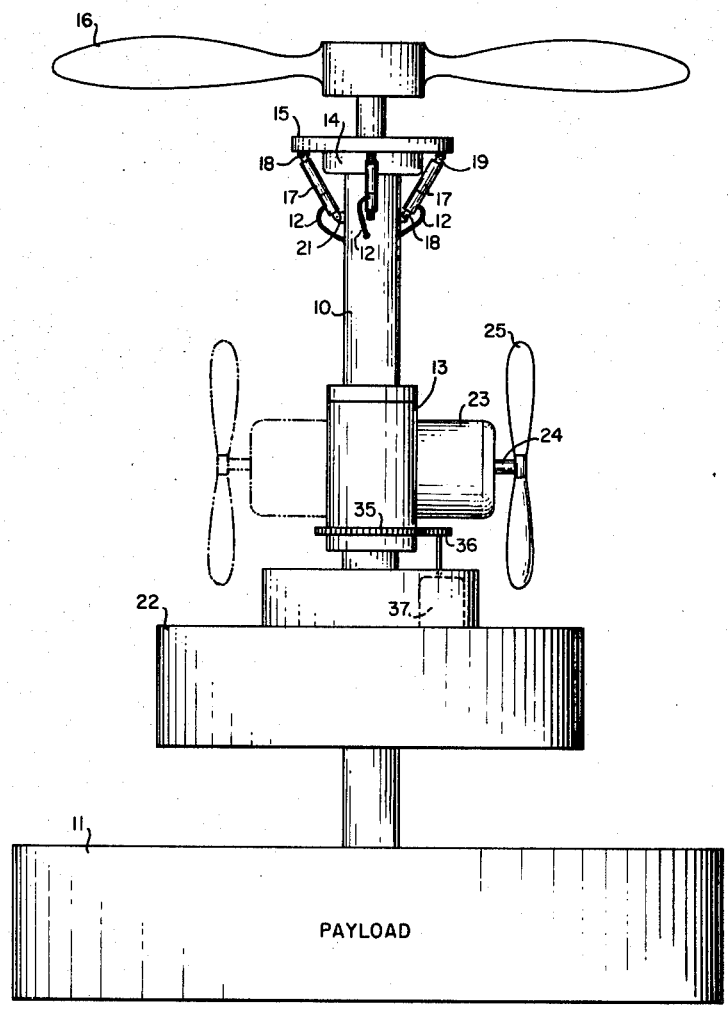
FIG. 1 illustrates a horizontal-propulsion means applied to an autogyro.

Referring now to the drawings, there is shown by illustration in FIG. 1 a payload carrying device similar to a powered autogyro which is movable horizontally in any direction while the payload is always directed in the direction or on the same heading. As shown, the device includes a vertical shaft 10 to which a payload 11 is secured to the bottom. The upper end of the vertical shaft is provided with a gimbal head 14 to which a flat plate 15 of any desired shape (round, square, rectangular, triangular) may be secured to the upper part of the gimbal head for tilting in any direction. A freely rotating lift propeller 16 is secured above the plate and tiltable therewith. The plate is controlled in its movement by a plurality of pistons 17, at least three, which may be hydraulically or electrically controlled. The upper end of the piston is pivotably secured to the plate such as by a bolt 18 or pin in a bracket 19 and the lower end of the piston is secured to a bracket 21 on the vertical shaft and moveable about a pin or bolt 18. For hydraulic control, hydraulic fluid lines 12 may extend along the inner surface of the vertical shaft to each of the pistons and down to a control unit 22 which may be remotely controlled to control the tilt of the plate and propeller relative to the horizontal plane for aiding in controlling the direction of the device. Instead of hydraulic pistons and control lines the pistons may be electrically controlled and operated by separate reversible motors which operate each separate piston. The controls for the separate motors may be in the control housing 22.

For horizontal movement a motor 23 is secured to the shaft just below the piston connection by a rotatable mounting 13 for 360° rotation about the shaft such that the motor shaft 24 is perpendicular to the main vertical shaft. A propeller 25 is connected to the motor shaft for rotation in a vertical plane parallel with the vertical shaft. The motor is for the purpose of moving the device in a horizontal direction. The rotatable mounting 13 may be provided between the horizontal drive motor and the vertical payload shaft for the purpose of locating the horizontal drive unit 20 for the motor 23. The control housing 22 may be mounted near the horizontal drive unit mounting 13 so that the horizontal drive-control transfer 36 may be made by gear or electric motor means 37.

The arrangement, as described above is for the purpose of moving the payload in any horizontal direction while keeping the payload oriented in the same direction or heading with respect to North. The device may be operated by remote control, by use of radio signals or through the use of a tether data link. In either case, the motor and piston controls may be carried aboard the lift device.

In operation of the device, the payload is secured to the vertical shaft and the lift propeller or rotor is rotated to initiate rotational motion. The horizontal direction motor 23 is operated to achieve forward motion and to further rotate the lift propeller which provides lift.

For guidance, to change the direction of movement of the airframe, the rotor is tilted such as in normal operation of an autogyro and the motor 23 is rotated with respect to the shaft in alignment with the direction in which it is desired to travel. Since the payload is secured to the vertical shaft and only the horizontal drive motor is rotated to change the direction of horizontal movement, the payload will remain in its direction of flight or heading. In addition, the rotor is tilted into the new direction. It is obvious that the horizontal drive motor will be rotated about the vertical shaft and that the payload will remain in its original heading. Therefore, the payload may be oriented in a specific direction relative to North and will remain on the set heading regardless of the horizontal direction of movement of the horizontal drive device. This is in contrast to normal movement of a powered autogyro in which the payload direction remains on the same heading as the horizontal directional movement of the entire powered autogyro airframe.

Figure 2:
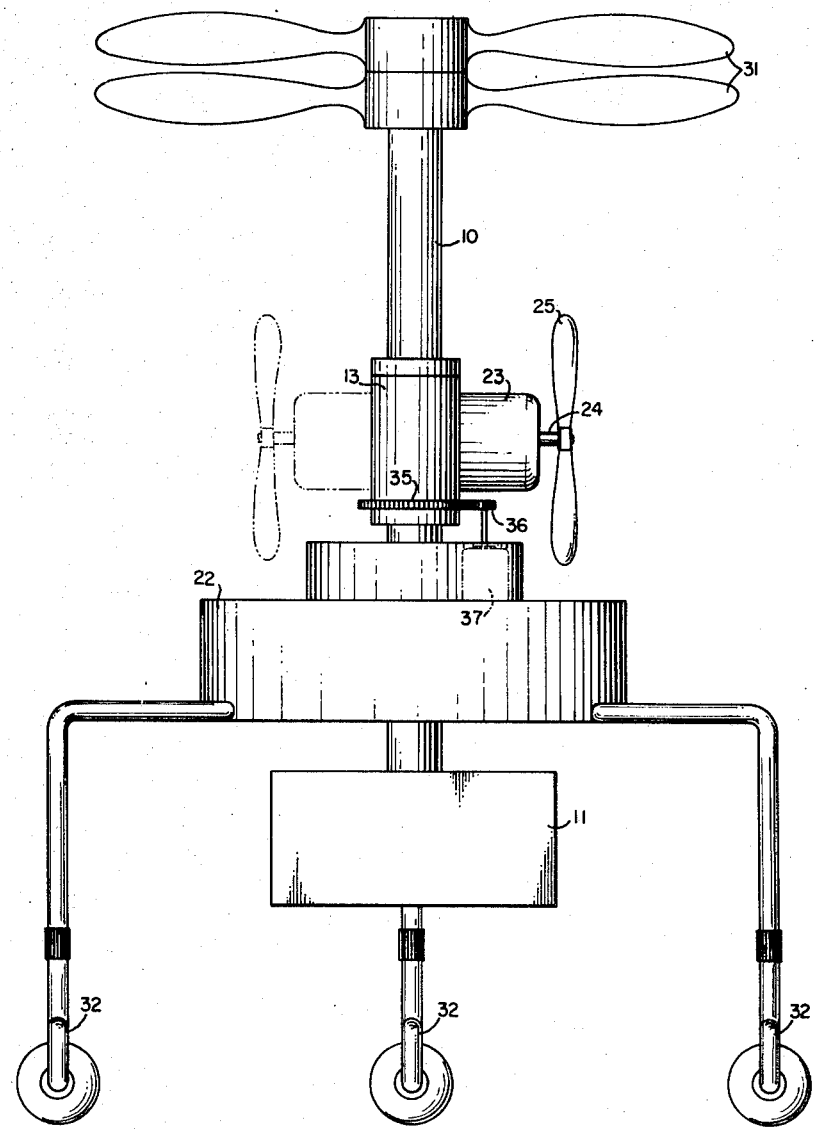
FIG. 2 illustrates the horizontal drive means applied to a vertical lift propeller driven device.

Referring to the drawing, FIG. 2, there is shown by illustration a schematic of a modification of the device shown in FIG. 1 for a powered rotor application. As shown, the device includes a vertical shaft 10 to which a payload 11 is secured at the lower end and a power driven propeller arrangement 31 is secured at the upper end for providing lift to the payload. The propeller arrangement may be a single rotating propeller or a double propeller as shown in which one propeller rotates in the opposite direction from the other to account for torque developed by the lift propeller system. As is well known in the art, the propeller blades should have a control means such that the pitch of the propeller blades may be changed in order to provide lift or stationary motion within the air once the device has been lifted to a desired position. Any suitable drive propulsion means may be used for rotating the propellers since such an arrangement is not the subject matter of the present invention. The lower end of the shaft may be provided with a suitable landing gear arrangement 32 for purposes of parking the device or moving it from place to place such that the device may be in position for vertical landing and take-off. As shown, a horizontal propulsion and directional movement motor 23 is mounted on the shaft by use of a bearing mounted sleeve 13. The bearing mounted sleeve is secured against vertical movement on the shaft, however, it is free for 360° rotational movement in a horizontal plane as set forth for the device in FIG. 1. For the purpose of rotating the horizontal propulsion motor to a desired position with respect to the shaft, the sleeve is provided by a driven gear 35 which is driven by a driving gear 36 secured to an electrically driven motor 37 or any other suitable means. The electrically driven motor may be controlled by a remote control or by any other means for rotating the motor mounted sleeve to any position relative to the shaft. A second motor and propeller is shown in dotted lines for the purposes of securing two axially aligned motors to the sleeve 13 in which the propellers may be rotated in opposite directions to account for any torque build up by the motor driven propeller.

In a device having a single lift propeller arrangement and a single horizontal movement and direction motor, the propeller directional motor may be driven in a direction which will overcome any torque made by the lift propeller. In those cases wherein there are mounted counter rotating propellers for lift, the horizontal driving means may be a double motor arrangement such as shown in solid and dotted lines.

It is well known in the art that the vertical lift propeller arrangement may be controlled for hovering at a particular level wherein the horizontal drive motor may be operated for the purpose of moving the device horizontally at a desired speed. For the purpose of varying the horizontal movement, the pitch or speed of the propeller on the horizontal directional drive motor may be controlled such that the device may propel the load at a greater or less speed along a horizontal line.

In operation of the power driven gyro shown in FIG. 2, the lift propellers may be driven by a gasoline engine or any other suitable engine which in turn generates an electrical power for operation of the horizontal driven motor with suitable controls for controlling the position of the horizontal driven motor. However, the horizontal driven directional movement motor may be driven by a separate gasoline or any other suitable engine. In some cases it may be desirable for the device to have a human operator aboard which would control the lift, vertical and horizontal movement power devices, however, the device may be operated by remote control wherein the operator will be stationed at a remote place. It is also possible for light loads, that the device may be operated entirely electrical wherein a tether line will be used to secure the electrical cable to a control device above which the propeller driven device may hover.

The devices have been shown with the directional control means motor mounted onto the vertical shaft with the driven gear on the sleeve to which the vertical propulsion motor is mounted. However, it would be within the skill of one in the art to mount the direction control motor onto the sleeve with a stationary drive gear being mounted onto the shaft.

The horizontal drive control means set forth by FIG. 2, is especially useful wherein one desires to maintain a lifted payload in a specific position with respect to some other object, therefore, the horizontal propulsion control motor will be rotated about the vertical shaft to a desired position for horizontal movement such that the payload will be retained in a specific direction with relationship to some other object. It is to be noted that the device may be moved in any direction, therefore, the device has no specific favored direction since the directional motor may be rotated about the shaft through 360 degrees movement. In this manner, the device may be moved back and forth or sideways while the load is positioned in the same heading, whenever desired.

Since the propulsion direction motor is rotatable about the shaft it can be seen that it is not necessary to make use of a rudder which is normally used for prior art devices.

The above has been set forth in application to a powered autogyro and a vertical lifting propeller arrangement, however, if desired, the device may be lift by a balloon or lighter than air means or ground-effect means which would be controlled in its horizontal movement and direction by the motor arrangement set forth above in FIGS. 1 and 2. The particular height to which the device will rise will depend on control means for the lifting method. Therefore, it is seen that the horizontal movement control device as set forth in FIGS. 1 and 2 of this invention may be used with motor driven vertical lift propulsion means or by a lighter than air means.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A device for lifting and sustaining a payload and always directing said payload on a desired heading which comprises, a fixed control housing, a vertical shaft extending above and below said control housing coaxially therewith, a vertical lift means secured to said shaft extending above said housing, a horizontal direction drive means mounted onto said shaft perpendicular thereto between said housing and said vertical lift means for 360 degree rotational movement around said shaft, a fixed control means positioned relative to said horizontal drive means and operative to rotatably position said horizontal direction drive means at any desired position about said shaft, and said shaft extending below said control housing having means to secure a payload thereto.

2. A device as claimed in claim 1; wherein, said horizontal drive means includes an electric motor driven propeller.

* * * * *